March 9, 1937.  B. WILLACH ET AL  2,072,915
BATTERY CONDITION INDICATING SYSTEM
Filed June 16, 1932  2 Sheets-Sheet 1
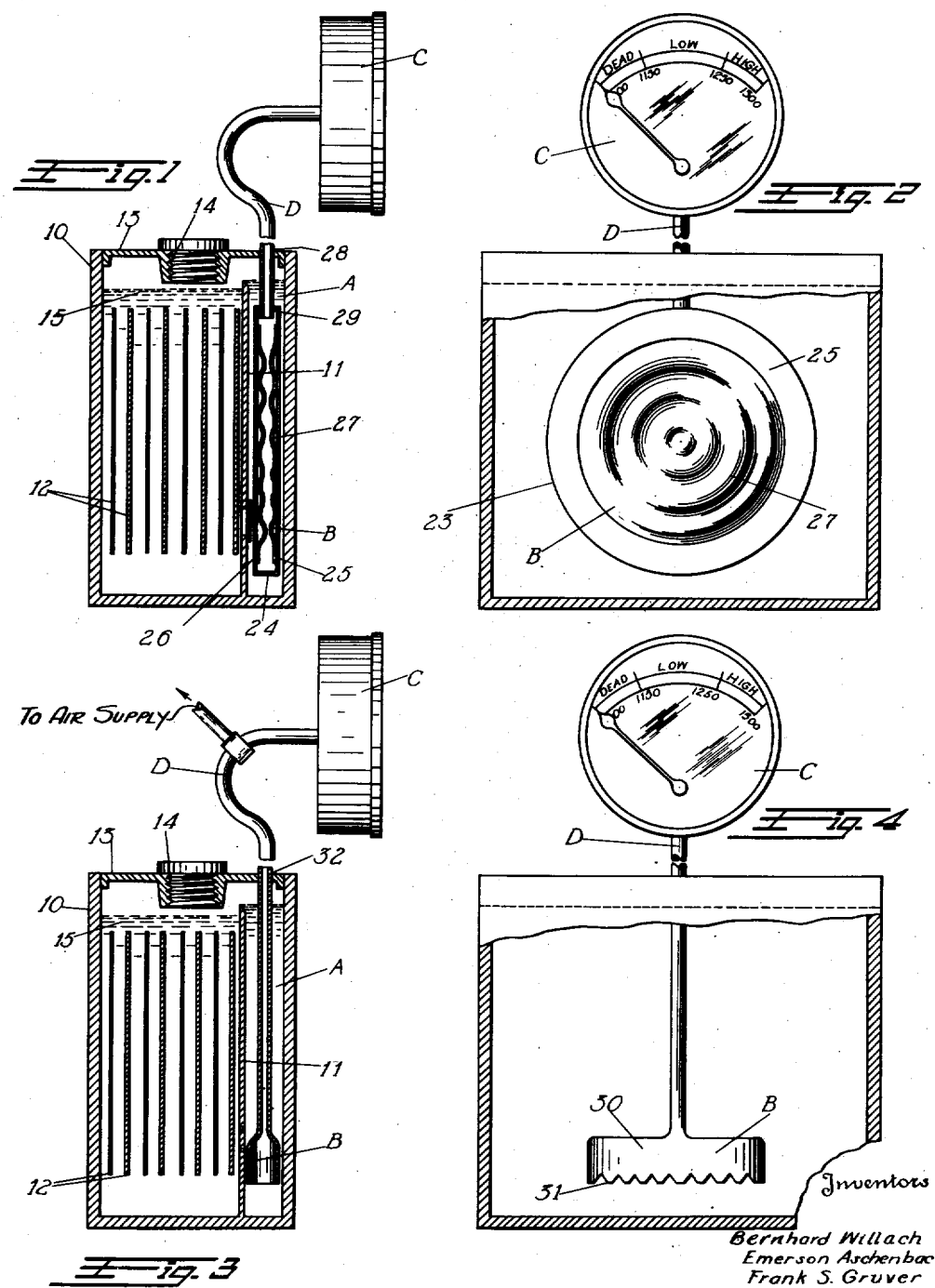
Inventors
Bernhard Willach
Emerson Aschenbach
Frank S. Gruver
Maximilian Klein March 9, 1937.  B. WILLACH ET AL  2,072,915
BATTERY CONDITION INDICATING SYSTEM
Filed June 16, 1932  2 Sheets-Sheet 2
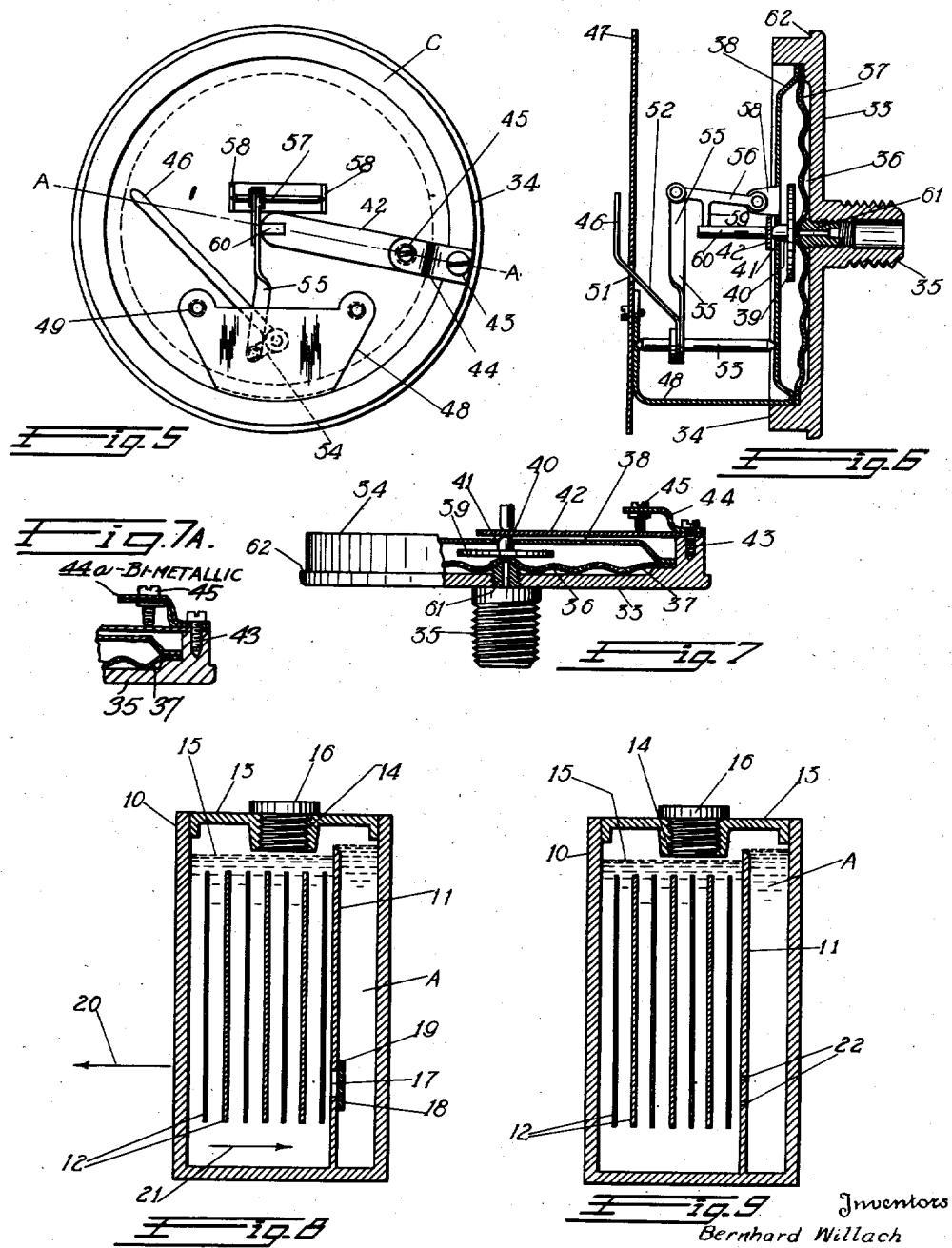
Inventors
Bernhard Willach
Emerson Aschenbach
Frank S Gruver
Maximilian Klein Patented Mar. 9, 1937

2,072,915

UNITED STATES PATENT OFFICE 2,072,915

BATTERY CONDITION INDICATING SYSTEM

Bernhard Willach, Emerson Aschenbach, Frank S. Gruver, and Maximilian Klein, Sellersville, Pa., assignors to United States Gauge Company, New York, N. Y., a corporation of Pennsylvania Application June 16, 1932, Serial No. 617,646

15 Claims. (Cl. 136—182)

This invention relates to a novel system for indicating the continuous condition of a wet battery, to novel components forming a part of said system, and to a method of indicating the specific gravity of a liquid.

Modern automobiles include as a part of their equipment, a storage battery of the wet type. The condition of such battery is not known to the user of the automobile, except when it is tested at long intervals by the use of a hydrometer or the like. In order to determine the condition of a battery in this way, it is necessary to remove the caps of the cells of the battery, and perform the testing operation by withdrawing some of the electrolyte from each cell temporarily into the testing device, the electrolyte being returned to the cell after the reading of the hydrometer usually forming a part of said testing device.

Furthermore, storage batteries are usually at relatively inaccessible parts of the automobile adding difficulties in the ascertainment of the condition of the battery. As a result the operators of automobiles generally do not know the condition of the battery of their car, except at relatively widely spaced intervals.

The primary object of the present invention is to provide a system for indicating the condition of wet batteries in such a way that the indication thereof may be shown where it may readily be seen, at all times, by the operator of the vehicle so that he is always aware of the condition of his battery, and can take any steps necessary to correct defects that, the indicator shows, have affected the battery to the end that the life of the battery may be preserved far beyond the time that may be expected under existing conditions, when defects especially affecting the battery, may not be discovered by the operator of the automobile until relatively long after correction should have been made.

A further object of the invention is to provide a novel battery that is especially designed so that it is feasible to attach thereto a simple and rugged means to always indicate its condition without disassembly of any part thereof.

Another object of the invention is to provide a wet battery designed particularly for use in a vehicle and to receive means to indicate the condition thereof, in which a separate cell is provided to isolate a portion of the electrolyte of the cell from the remainder, and including means to cause the electrolyte to be maintained at an invariable height in said cell and to cause circulation of the electrolyte to the cell, and vice versa, as an incident to the movement of the vehicle in which the battery is used.

Another object of the invention is to provide a wet battery that includes a cell to facilitate indication of the charge of the electrolyte in which the cell is formed by a wall separating a portion of the battery container from the remainder, the wall having a height greater than the normal height of the electrolyte in the battery, and arranged so that the movement of the automobile in which the battery is mounted automatically affects a circulation of the electrolyte to the cell and to maintain a constant level of electrolyte therein, irrespective of the exact height of the electrolyte in the battery.

Still another object of the invention is to provide an indicating system to show the condition of a wet battery in which the indicator is operated by the pressure of electrolyte of an invariable depth, and thus depending solely upon the specific gravity of the liquid, upon a flexible wall, the movement of which is utilized to give the desired indication.

This invention also aims to provide means for indicating the specific gravity of the electrolyte of a wet battery, that is designed so that the changes in specific gravity are made effective to oscillate a fluid column that serves to connect a unit permanently positioned in the battery with an indicator, that may be disposed where it may be conveniently seen by those who should be interested in the condition of the battery.

Still another object of the invention is to provide a battery condition indicating system having means for indicating the condition of a wet battery, designed so that changes in the specific gravity of the electrolyte of the battery affect a flexible part of the wall of a unit disposed in the battery, which wall is operatively connected with a relatively remotely disposed indicator that has a flexible wall that is moved in accordance with an increase or decrease of the specific gravity of the electrolyte.

A further object of the invention is to provide an improved unit that may be permanently installed in a storage battery in such manner that changes in the specific gravity of the electrolyte of the battery will cause a proportionate movement of a wall or walls of the unit thus assembled with the battery.

Still another object of the invention is to provide a system of indicating the condition of a wet battery in which use may be made of an indicating instrument, including a diaphragm the movement of which is utilized to give the indication of the condition of the battery.

Still another object of the invention is to provide a system for indicating the specific gravity of the liquid of a container, that includes a unit having a movable wall that is immersed to a definite extent in the container and an indicating device that is actuated by a second flexible wall coupled to said first named wall in such a way that the walls move in unison in accordance with changes in specific gravity of the liquid.

Another object of the invention is to provide a method of indicating the specific gravity of the wet battery of a vehicle consisting in isolating a portion of the electrolyte from the remainder in a cell of a battery, causing the motion of the vehicle to maintain said portion of the electrolyte at a predetermined invariable height and at the same time to circulate the electrolyte from the battery to the cell and vice versa, and indicating the specific gravity in said cell by means of an indicating unit responsive to pressure by immersion of said unit to a definite depth in said cell.

Another object of the invention is the provision of an improved diaphragm gauge for indicating the specific gravity of a liquid disposed in a relatively remotely located container, such as a wet battery, in which improved means are provided to determine the zero or starting position of the diaphragm, and to adjust the point at which the operation of the diaphragm shall begin.

Still further objects of the invention will appear as a description thereof proceeds with reference to the accompanying drawings, in which:

Figure 1 is a part section and part side elevational view of one form of the improved system for indicating the condition of an automobile battery.

Figure 2 is a part sectional and part end view of the apparatus shown in Figure 1.

Figures 3 and 4 are views similar to Figures 1 and 2, respectively, but showing a modified form of the invention.

Figure 5 is a front view of the preferred form of indicating instrument forming a part of the system of the present invention, the dial and casing of the instrument being removed to show the mechanism concealed thereby.

Figure 6 is a sectional view of the indicating instrument of Figure 5, the dial being shown in position.

Figure 7 is a part section and part plan view, the section being taken on the plane indicated by line A—A in Figure 5.

Figure 7A is a fragmental sectional view of a modified form of indicator construction.

Figure 8 is a sectional view of a battery cell forming a part of the system illustrated in Figures 1 and 2 of the drawings, the battery being shown on an enlarged scale.

Figure 9 is a view similar to Figure 8 showing the form of battery constituting a part of the invention illustrated in Figures 3 and 4, of the drawings.

Like reference characters indicate like parts throughout the several figures.

The system of the present invention requires a wet battery of a special construction. Such battery is modified to provide a pilot cell indicated generally by A. The system further includes a unit B disposed within the pilot cell, and designed to respond to variations in specific gravity of the electrolyte within the cell, an indicator designated by C, and a connection D for transferring variations in specific gravity affecting the unit B to the indicator.

In order that the unit B may respond solely to changes of specific gravity it is essential that the height of the electrolyte affecting the unit B which is immersed at a definite point below the level thereof, be maintained invariable. In order that this condition may be attained in a battery, a pilot cell A is provided. Such a cell may be formed in many ways, but preferably, it is formed by separating a portion of the container 10 of the battery from the remainder thereof, by providing a wall or partition 11 spaced from one end of the container, said wall or partition extending completely across the container. The plates 12 of any convenient form are disposed in the container proper, which is provided with a top 13 provided with the usual opening 14 the wall of which may be threaded to receive the customary cap to close the container. It will be observed that the wall 11 extends upwardly to a point above the lower edge of the annular wall surrounding the opening 14, which lower edge determines the maximum height of the electrolyte 15 within the battery. A suitable cap 16 closes the opening in the battery.

The partition wall 11, is preferably provided with a passage 17 the flow through which is controlled by means of a check valve 18, preferably made in the form of a soft pliable rubber flap, that is secured to the side of the partition 11 forming one wall of the pilot cell A as indicated at 19. The wall, 11, is preferably formed as an integral part of the battery housing formed of molded rubber, and the flap valve may be vulcanized or glued to said wall. If desired, the valve 18 may be formed of metal not affected by the electrolyte and secured to the wall by a flexible hinge of any type.

Usually an automobile battery consists of three cells arranged side by side. Each of said cells may be provided with a pilot cell such as just described, though, preferably, it is proposed to provide only one of the cells of the battery, with a pilot cell, although, if it is desired to indicate the condition of every cell of the battery a pilot cell is provided in each, of the form just described.

The arrangement just described will automatically maintain the level of electrolyte in the pilot cell at a point coinciding with the top of the wall or partition 11. This is accomplished by installing the battery in the automobile so that the pilot cell is disposed to the rear of the battery so that when the car is accelerated in the direction of the arrow 20 the inertia of the electrolyte in the battery will result in a motion of the liquid in the direction of the arrow 21. The impact of said liquid against the check valve 18 causes it to open momentarily, thus resulting in a flow of electrolyte from the battery proper into the pilot cell. The surplus liquid in the pilot cell will overflow the top of the wall 11 so that the level indicated in the drawings will be maintained constant in the pilot cell. At the same time it will be noted that the normal movement of the automobile will cause the circulation to take place intermittently from the battery to the pilot cell, so that an indication of the condition of the electrolyte in the pilot cell will give a true indication of the electrolyte in the battery proper. With this arrangement it is entirely feasible, by disposing a device having a flexible wall to a predetermined depth in the pilot cell, to have said wall respond to changes in specific gravity of the electrolyte in the pilot cell, since the pressure of the liquid on said wall will then vary solely in accordance with the changes in specific gravity of the electrolyte, the head of the fluid above said flexible wall remaining invariable.

If desired, the partition 11 may be constructed as shown in Figure 9 of the drawings, in which, only restricted passages 22 are provided therethrough adjacent the bottoms thereof instead of the relatively large passages 17 and check valve 18. In this form of the invention a pilot cell is maintained full of electrolyte to the upper edge of the wall 11 by virtue of the fact that when the automobile, in which the battery is intended to be installed, is in operation, the electrolyte will flow or splash over the upper edge of the wall. Since this action takes place when the car is in motion the electrolyte will be maintained at the desired level, circulation taking place from the pilot cell to the battery proper through the openings 22 at the same time. Of course, when the vehicle is at rest the level of the electrolyte in the pilot cell will drop to the level of the electrolyte in the battery, by virtue of the fact that the electrolyte is free to flow from the pilot cell into the battery through the openings 22 in the wall 11. In this form of the invention the specific gravity indicator would have to be read, in order to get a proper indication, when the car is in motion, and the level of electrolyte in the cell is in coincidence with the upper edge of the wall 11.

The unit B of the specific gravity indicating system may consist of a ring member 23, the edges of which are formed by an annular ring 24 having inwardly extending flanges 25 and 26. The circular opening between said flanges in each side of the said member 23 is closed by a diaphragm 27, secured in any approved manner at the edges to said flanges, so as to provide a fluid tight joint at all points. The flexible walls formed by the diaphragms 27 are constructed of a material that is unaffected by the electrolyte, such as rubber, for example. If desired, one side of the member 23 may be made solid and a single diaphragm 27 utilized to close the other side thereof.

The conduit D is connected to the member 23 by being passed through the top 13 of the battery, as indicated at 28, and is passed through the portion 24 of the member 23 at 29, so that the interior of the member 23 is put in communication with the indicating gauge C.

It will readily be understood that since the height of the electrolyte in the pilot cell in which the member 23 is disposed is maintained at the same point, the pressure on the flexible wall or walls 27 will vary in accordance with the changes in specific gravity of the electrolyte that bear against the wall or walls, thus exerting a varying pressure upon any medium in the member 23 that is in contact with said wall or walls.

If desired, the unit B that is designed to respond to changes in specific gravity of the electrolyte in the pilot cell A may assume the form shown in Figures 3 and 4, instead of that illustrated in Figures 1 and 2. In this form of the invention a bell-like member 30 having its open end facing downwardly, is disposed at a predetermined point within the normal level of the electrolyte in the pilot cell A. The lower edge of said bell-like member may be provided with a plurality of V shaped notches 31 for a purpose hereinafter described. Said member is then connected to the indicator by the conduit D which passes through the top of 13 of the battery at 32. In this form of the invention it will be observed that the pressure of the electrolyte in the pilot cell A upon a gaseous column terminating in the bell B varies in accordance with the specific gravity of the electrolyte in said member since the height of the liquid above the mouth of the bell remains invariable.

Referring now to Figures 5, 6, and 7, disclosing the preferred form of indicating instrument, it is preferred that the instrument consist of a base plate 33 provided with an annular projection 34 extending away from said base plate in one direction. Extending away from the plate in the other direction is an externally threaded hollow extension 35, the external threads of which may be connected in any suitable manner to the conduit D above referred to. The base plate 33 is recessed at 36, within the annular projection 34, and a flexible diaphragm 37 is disposed on the margin of the plate surrounding the recess. The diaphragm 37 may be constructed from silk treated with varnish, goldbeaters skin, rubber or the like. The diaphragm 37 is secured in position by means of a plate, 38, disposed within the annular projection 34, and secured in clamping engagement with said diaphragm in any approved manner. It will be observed that a chamber is formed between the wall of the recess 36, and the diaphragm 37, and the movement of the diaphragm 37 is limited by the plate 38 that secures it to the base pate.

Secured in any approved manner to the central part of the diaphragm 37 is a disk like member 39 having a projection 40 that extends through opening 41 in the plate 38. A leaf spring 42, secured at one end to the annular projection 34 by means of a screw 43 that, at the same time, secures a bracket 44, above said end of the spring 42. The free end of the spring 42 bears upon the projection 40 above referred to, and serves to resist the movement of the diaphragm, to which said projection is secured, in a direction away from the recess 36 in the base 33. An adjusting screw 45 is threaded through the bracket 44, as shown in the drawings, and bears upon the spring 42 providing a ready means for adjusting the effect of the spring 42 upon the diaphragm 37 in resisting the movement away from recess 36. By this arrangement it will be readily understood that the movement of the diaphragm 37 may be suppressed or restrained until the pressure within the diaphragm chamber overbalances the effect of the spring 42. In this way the indicating instrument can readily be made unresponsive to pressures within the diaphragm chamber below a minimum determined by the resistance caused by the spring 42 to the movement of the diaphragm.

In order that movement of the diaphragm may be made apparent on a dial containing a suitable scale, the movement of the diaphragm is transmitted to a pointer 46 moving over a dial 47 that is secured to a bracket like extension 48, preferably formed as a part of the plate 38 before referred to. The dial 47 is secured to the bracket 48 by suitable fastening means engaging the fastener receiving openings 49 in suitably formed ears of said bracket. The pointer 46 passes through an opening 51 in the dial 47 being offset, as shown at 52, in order that this may be done.

The pointer is rigidly secured to a spindle 53 the ends of which are journaled in any suitable way in the plate 38 and bracket 48. In order that the pointer, secured to the spindle 53, may be actuated in accordance with movement in the diaphragm, the spindle 53 is provided with a crank arm 54 that is connected to link 55 which, at a point remote from crank 54, is pivotally connected to a link 56 secured to a spindle 57 that is suitably journaled at its end in ears 58 that may be struck from the plate 38 to cheapen the construction. The link 56 has an arm 59 projecting away therefrom, and intermediate the ends thereof, an arm 66 bearing against the spring 42, preferably directly opposite the point of said spring at which the projection 46 engages the same. The indicating mechanism is concealed in use by a casing that engages the shoulder 62 of the base 33, the dial 47 being preferably covered by means of a suitable crystal and bezel as well understood in the art.

In order to be able to conveniently vary the initial position of the diaphragm the extension 35 is preferably internally threaded and a screw 61 is threaded therein into contact with the diaphragm. The position of the screw 61 may be varied, said screw being preferably provided with a slot for the convenient engagement of a tool such as a screw driver. Screw 61 is provided with a bore extending centrally therethrough so that the diaphragm is put into communication with the bore in the tubular extension 35.

In operation, when the pressure in the diaphragm chamber exceeds the predetermined amount necessary to overcome the effect of the spring 42 the diaphragm is caused to move away from the stop 61. Said movement causes a swinging movement of the link 56 through the arms 59 and 60. The swinging movement of link 56 actuates crank 54 through link 55, the latter operating shaft 53 and causing movement of the pointer rigidly secured thereto over the scale on dial 47, in accordance with the extent of movement of the diaphragm which varies with the degree of pressure in the diaphragm chamber.

In the use of the indicating device just described, in the relation indicated in Figures 1 and 2 of the drawings, the unit B, conduit D and diaphragm chamber in the indicating gauge C are completely filled with combinations of gases and liquids, or combinations of solids and gases, the combinations being selected to compensate for changes in temperature. A mixture of hydrogen and palladium may be used for this purpose, as palladium has been found to manifest the property of absorbing increased quantities of hydrogen at increased temperatures. For instance, a strip or a mass of granular palladium may be used and be located in any of the parts that are suitable, for instance, the palladium may be introduced into diaphragm chamber 27 in Figure 1 or in tube D interconnecting the diaphragm and the gauge. Or a bimetallic compensating spring may be installed in the indicator to compensate for temperature changes in which event any liquid or fluid column may be employed to transmit fluctuations in the flexible wall of unit B to the indicator C. For instance bracket 44 or link 55 may be made of a bimetallic strip, and hence be temperature responsive to compensate for thermally induced expansion of the fluid in the parts. In Figure 7A I have illustrated an organization of this character. Bracket 44A is a bi-metallic strip and is so designed that when the temperature increases its free end will tend to flex downwardly and hence depress the indicator reading. Bracket 44A is so designed that it will depress the reading to properly compensate for the higher reading that would otherwise result because of the gas in the system expanding.

It will be readily understood that when the system is filled as just described, the fluctuations in pressure adjacent the diaphragm will be communicated through the medium in the system to the diaphragm 37 of the indicating gauge, the movement of the latter diaphragm actuating the pointer moving over a scale that may be suitably calibrated and provided with indicia to show the significance of the position of the pointer at various points upon the dial, as indicated in Figures 2 and 4 of the drawings.

In the use of the invention as illustrated in Figures 3 and 4 air may be used as the means for actuating the diaphragm of the indicating gauge. In putting the arrangement in operation the bell B, the conduit D and the diaphragm chamber in the indicating instrument are filled with air, manually, automatically, or by means of a pump, to the apexes of the triangular notches formed in the bottom of the bell to the indicating instrument, any excess air bubbling out of the system at said apexes, when the system is filled in the manner just stated. The air introducing means has not been illustrated in order to simplify the disclosure, but one way in which it may be associated with the parts would be to connect a pump or other air supplying device to the branch pipe shown in Figure 3 as leading off from conduit D, and if desired, through a suitable valve so that after the lines have been cleared, the valve could be closed to permit a reading of the specific gravity to be taken. The pressure of the air therein varies with variations in specific gravity of the liquid in the pilot cell A, such variations in pressure being communicated to the diaphragm 37 of the indicating instrument, by means of which the pointer of the indicating gauge is actuated to show said variations.

The indicating gauge may be disposed on the dash of the vehicle in such manner that the face thereof may be readily seen by the operator of the vehicle so that the condition of the battery is apparent to him at all times, or if desired, the indicating instrument may be positioned at any other convenient place, or simply upon the top of the battery to which the system is to be applied, so that the condition of the battery may be told by reading the instrument attached thereto. If desired, separate indicators may be provided for each cell or group of cells constituting the battery of an automobile, or a unit B may simply be disposed in each cell of the group of cells, and the conduits D leading therefrom connected to a single indicating gauge so that the latter may give an average reading of the condition of the cells of the group.

The parts of the system, it will be observed further, are rugged of construction, and will not readily get out of order, so that the operation thereof can be relied upon over a long period of time. At the same time the parts entering into the system are extremely simple in construction so that the whole combination can be supplied at a very low cost. The change in the construction of the battery, to adapt it to receive the device for indicating the specific gravity of the electrolyte is relatively slight, so that the cost of production of the battery is not materially increased thereby. Inasmuch as the motion of the vehicle is relied upon to maintain the electrolyte at a definite level in the pilot cell, the operation of the system is reliable and automatic.

In the appended claims, the term "pilot cell" is intended to embrace an auxiliary cell, as distinguished from mere test cell, and is intended to apply to a cell wherein a body of electrolyte is segregated for the purpose of allowing its variation in density to operate upon an indicating mechanism.

The invention may be embodied in other specific forms without departing from the spirit or essential characteristics thereof. The present embodiment is therefore to be considered in all respects as illustrative and not descriptive, the scope of the invention being indicated by the appended claims rather than the foregoing description, and all changes which come within the meaning and range of equivalency of the claims are therefore intended to be embraced therein.

What is claimed and desired to be secured by United States Letters Patent is:—

1. A wet battery for a vehicle designed to receive means to indicate the condition thereof comprising a pilot cell formed in the battery by a wall slightly higher than the normal height of the electrolyte in the battery, said wall arranged to form a relatively large opening through which the electrolyte may splash to fill the cell to a constant level upon acceleration or deceleration of the vehicle.

2. A wet battery for a locomobile vehicle, said battery designed to receive means to indicate the specific gravity of the electrolyte comprising a pilot cell designed to separate a small portion of the electrolyte from the body thereof, and means responsive to changes in linear speed of the locomobile vehicle to fill said cell to a constant level with electrolyte irrespective of changes of level in said battery.

3. A wet battery having electrolyte of variable level and designed to receive means to indicate the specific gravity of the electrolyte, comprising a pilot cell designed to separate a small portion of the electrolyte from the body thereof, means responsive to vibrations of said battery to fill said cell to a constant level with electrolyte independently of the level in said body, and means to provide for a circulation of electrolyte between said cell and said body.

4. A wet battery provided with a pilot cell to facilitate indication of the specific gravity of the electrolyte, said cell being formed by a wall separating a portion of the battery container from the remainder, said wall having an effective partitioning height at least as great as the normal height of electrolyte in the battery, and having a passage therethrough below said normal height for the circulation of electrolyte between said cell and said remainder, and one-way valve means controlling said passageway to permit electrolyte to be forced from said remainder into said cell.

5. The combination defined in claim 4, said valve means being arranged for automatic operation upon movement in one direction of said battery.

6. In combination, a wet battery assembly including a pilot cell built into the battery and open to atmospheric pressure at a point higher than the normal height of electrolyte in the battery, means, forming a part of the battery, for maintaining a constant effective head of electrolyte in said cell by transferring battery electrolyte to said cell, a pressure responsive unit disposed in said cell and having a part which is automatically movable in response to changes in specific gravity of the electrolyte forming said effective head in said cell, an indicator, and motion transmitting means connecting the movable part of said unit and said indicator.

7. The method of indicating the specific gravity of a wet battery of a vehicle, which consists in isolating a portion of the electrolyte from the remainder, utilizing the vibratory movements of the vehicle in normal operation to maintain said portion of the electrolyte at a predetermined invariable height for producing a constant effective liquid head and to cause circulation between the said portion and the remainder and vice versa, and indicating the pressure resulting from said constant head in terms of specific gravity of the electrolyte.

8. In a system for indicating variations in the density of a body of liquid, a pressure-responsive indicating device, a conduit connected to said device, and subjected at one end to the pressure existing at a predetermined depth in the liquid, and means for maintaining a constant effective vertical liquid column above said predetermined depth, whereby the pressure at said depth will vary solely in response to changes in the density of the liquid, a pressure transmitting medium having a substantially zero coefficient of expansion under initial pressure in said conduit, said pressure transmitting medium comprising a fluid in surface contact with a substance which is operable to absorb increased quantities of said fluid at increased temperatures and counteract the normal tendency of said fluid to expand and increase the normal pressure in said conduit in response to increases in temperature.

9. In the combination defined in claim 8, said pressure transmitting medium consisting of hydrogen gas in the presence of a mass of palladium.

10. In combination, a transportable wet battery adapted to be used with an apparatus subjected to vibration, means to indicate the condition thereof, comprising a pilot cell formed in the battery by a wall slightly higher than the normal height of the electrolyte in said battery, means responsive to vibration of said battery to deliver electrolyte from said battery to said cell to cause said cell to overflow thereby maintaining the level of electrolyte in said cell substantially at the top of said wall.

11. An indicating system for a wet battery comprising means associated with said battery adapted to hold a liquid, means responsive to variations of movement of said battery and said associated means to deliver electrolyte from said battery to said associated means and to maintain an invariable head of electrolyte therein, means disposed in the electrolyte in said associated means and operable to undergo movement in response to changes in the specific gravity of said electrolyte, a pressure responsive indicator and means including a fluid column for transmitting movements of said third named means to said indicator.

12. A wet battery for use in a vehicle subjected to vibrations when operated, having a closed top provided with a pilot cell to facilitate indication of the specific gravity of the electrolyte of said battery, said cell being formed by a wall separating a portion of the battery container from the remainder, said wall having a partitioning height at least as great as the normal height of electrolyte in said battery, there being an opening between the top of said wall and said top through which electrolyte may splash into said cell when said battery and cell are vibrated, an opening in said wall below said normal height for the passage of electrolyte between said cell and said remainder, said last mentioned opening being extremely small as compared to said first mentioned opening whereby the level of the electrolyte splashed into said cell will remain substantially at the same plane as the effective height of said wall when the battery and cell are subjected to vibrations incidental to the operation of said vehicle.

13. A wet battery for a locomobile vehicle designed to receive means to indicate the specific gravity of the electrolyte, comprising a pilot cell formed by a wall within said battery to separate said cell from the remainder of said battery, to receive a portion of the electrolyte from said battery and means responsive to changes in speed of said locomobile vehicle to fill said cell to overflowing and means near the bottom of said wall to allow electrolyte to leak back into said battery whereby the electrolyte in said cell will have the same specific gravity as the electrolyte in the battery, the level of the electrolyte in said cell remaining at the top of said wall while said locomobile vehicle is subjected to vibrations incidental to the operation thereof.

14. In a unit adapted to indicate pressures produced by liquid heads, a pressure responsive device, an open vessel adapted to be inverted with its open edge below the surface of a liquid, a gaseous column of less specific gravity than that of the liquid, the head of which is to be measured, connecting said device and said vessel, said vessel having a series of many closely spaced notches in its open edge to prevent the formation of harmful bubbles at the boundary of said column and said liquid.

15. The method of indicating the specific gravity of a wet battery of a vehicle, which consists in isolating a portion of the electrolyte from the remainder, utilizing the changes in linear speed of the vehicle in normal operation to maintain said portion of the electrolyte at a predetermined invariable height for producing a constant effective head and to cause circulation between the said portion and the remainder and vice versa, and indicating the pressure resulting from said constant head in terms of specific gravity of the electrolyte.

BERNHARD WILLACH.
EMERSON ASCHENBACH.
FRANK S. GRUVER.
MAXIMILIAN KLEIN.

CERTIFICATE OF CORRECTION.

Patent No. 2,072,915.                                   March 9, 1937.

BERNHARD WILLACH, ET AL.

It is hereby certified that error appears in the printed specification of the above numbered patent requiring correction as follows: Page 5, second column, line 29, claim 10, strike out the word "transportable" and insert the same before "wet" in line 40, claim 11; page 6, first column, line 1, claim 13, after "vehicle" insert the comma and words , said battery; and that the said Letters Patent should be read with these corrections therein that the same may conform to the record of the case in the Patent Office.

Signed and sealed this 20th day of April, A. D. 1937.

(Seal)
Henry Van Arsdale
Acting Commissioner of Patents.

13. A wet battery for a locomobile vehicle designed to receive means to indicate the specific gravity of the electrolyte, comprising a pilot cell formed by a wall within said battery to separate said cell from the remainder of said battery, to receive a portion of the electrolyte from said battery and means responsive to changes in speed of said locomobile vehicle to fill said cell to overflowing and means near the bottom of said wall to allow electrolyte to leak back into said battery whereby the electrolyte in said cell will have the same specific gravity as the electrolyte in the battery, the level of the electrolyte in said cell remaining at the top of said wall while said locomobile vehicle is subjected to vibrations incidental to the operation thereof.

14. In a unit adapted to indicate pressures produced by liquid heads, a pressure responsive device, an open vessel adapted to be inverted with its open edge below the surface of a liquid, a gaseous column of less specific gravity than that of the liquid, the head of which is to be measured, connecting said device and said vessel, said vessel having a series of many closely spaced notches in its open edge to prevent the formation of harmful bubbles at the boundary of said column and said liquid.

15. The method of indicating the specific gravity of a wet battery of a vehicle, which consists in isolating a portion of the electrolyte from the remainder, utilizing the changes in linear speed of the vehicle in normal operation to maintain said portion of the electrolyte at a predetermined invariable height for producing a constant effective head and to cause circulation between the said portion and the remainder and vice versa, and indicating the pressure resulting from said constant head in terms of specific gravity of the electrolyte.

BERNHARD WILLACH.
EMERSON ASCHENBACH.
FRANK S. GRUVER.
MAXIMILIAN KLEIN.

CERTIFICATE OF CORRECTION.

Patent No. 2,072,915.            March 9, 1937.

BERNHARD WILLACH, ET AL.

It is hereby certified that error appears in the printed specification of the above numbered patent requiring correction as follows: Page 5, second column, line 29, claim 10, strike out the word "transportable" and insert the same before "wet" in line 40, claim 11; page 6, first column, line 1, claim 13, after "vehicle" insert the comma and words , said battery; and that the said Letters Patent should be read with these corrections therein that the same may conform to the record of the case in the Patent Office.

Signed and sealed this 20th day of April, A. D. 1937.

(Seal)                          Henry Van Arsdale
                                Acting Commissioner of Patents.

CERTIFICATE OF CORRECTION.

Patent No. 2,072,915.                                                                 March 9, 1937.

BERNHARD WILLACH, ET AL.

It is hereby certified that error appears in the printed specification of the above numbered patent requiring correction as follows: Page 5, second column, line 29, claim 10, strike out the word "transportable" and insert the same before "wet" in line 40, claim 11; page 6, first column, line 1, claim 13, after "vehicle" insert the comma and words , said battery; and that the said Letters Patent should be read with these corrections therein that the same may conform to the record of the case in the Patent Office.

Signed and sealed this 20th day of April, A. D. 1937.

(Seal)
                                                                Henry Van Arsdale
                                                         Acting Commissioner of Patents.